Figure 1:
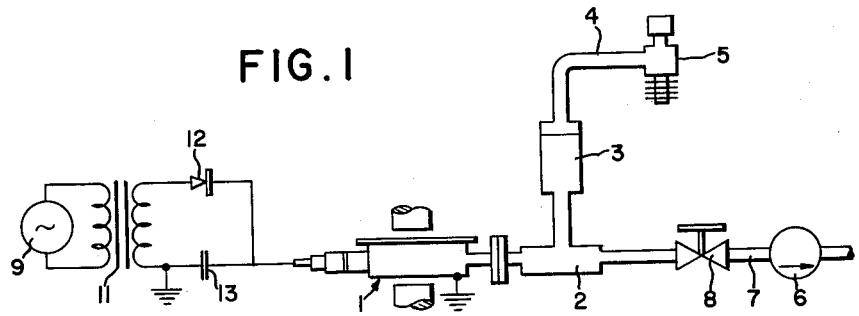

May 28, 1963 S. L. RUTHERFORD ETAL 3,091,717
CATHODES FOR MAGNETICALLY-CONFINED GLOW DISCHARGE DEVICES
Filed Dec. 23, 1960 3 Sheets-Sheet 1

INVENTORS
SHERMAN L. RUTHERFORD
ARTHUR B. FRANCIS
WILLIAM A. LLOYD

BY *[signature]*
ATTORNEY

May 28, 1963   S. L. RUTHERFORD ETAL   3,091,717
CATHODES FOR MAGNETICALLY-CONFINED GLOW DISCHARGE DEVICES
Filed Dec. 23, 1960   3 Sheets-Sheet 2

INVENTORS
SHERMAN L. RUTHERFORD
ARTHUR B. FRANCIS
WILLIAM A. LLOYD
BY
ATTORNEY

May 28, 1963   S. L. RUTHERFORD ETAL   3,091,717
CATHODES FOR MAGNETICALLY-CONFINED GLOW DISCHARGE DEVICES
Filed Dec. 23, 1960   3 Sheets-Sheet 3

INVENTORS
SHERMAN L. RUTHERFORD
ARTHUR B. FRANCIS
WILLIAM A. LLOYD

BY *Harry E. Aine*
ATTORNEY

United States Patent Office 3,091,717
Patented May 28, 1963

3,091,717
CATHODES FOR MAGNETICALLY-CONFINED
GLOW DISCHARGE DEVICES
Sherman L. Rutherford, Palo Alto, and Arthur B. Francis
and William A. Lloyd, Sunnyvale, Calif., assignors to
Varian Associates, Palo Alto, Calif., a corporation of
California
Filed Dec. 23, 1960, Ser. No. 78,058
19 Claims. (Cl. 313—181)

The present invention relates in general to magnetically-confined glow discharge devices and more particularly to improved sputter cathode grid configurations for such devices whereby the operating lifetime, thermal conductivity, mechanical rigidity and ease of fabrication of such cathodes are enhanced. These improved cathode configurations increase the operating lifetime of devices utilizing ion bombarded sputter cathodes such as, for example, getter ion vacuum pumps and Penning vacuum gauges.

Heretofore sputter cathode grids have been proposed for cold cathode glow discharge getter ion pumps and Penning vacuum gauges. These sputter cathode grids were typically formed, for example, by a plurality of closely spaced slats or a stacked wire mesh forming the ion bombarded surface portion of the cold cathode. See copending application, U.S. Serial No. 673,816, filed July 24, 1957, now Patent No. 2,993,638, entitled "Electrical Vacuum Pump Apparatus and Method." A sputter cathode grid for pump applications permits increased sputtering over that obtained from a flat cathode plate, thereby increasing the amount of gettering material sputtered from the cathode to enhance the gettering action of the pump. Another inherent advantage of the sputter cathode grid is that it provides, within its interior, areas where there is a net build up of sputtered cathode material. These net build-up areas are subject to ion bombardment whereby the bombarding ions may be buried and covered over with subsequently sputtered cathode material. This ion burial and covering over mechanism is especially beneficial when pumping noble gases such as, for example, argon, neon, krypton, and the like. The increased pumping speed for argon eliminates argon instability, sometimes encountered, when pumping air with flat cathode plates.

A recent improved sputter cathode grid configuration, forming the subject matter of U.S. Patent 3,070,719 copending with the present application and assigned to the same assignee of the present invention, includes the provision of supporting the cathode slats or wire mesh from a base member. The base member is joined to the grid along the bottom edges of the aforementioned grid. The base member increases thermal conductivity from the slats, mesh, or the like, forming the grid and assures mechanical rigidity, and facilitates fabrication of the sputter cathode grid.

One difficulty encountered with sputter cathode grids is that erosion of the cathode grids, due to ion bombardment, is not uniform over the surface of the grid. More specifically, it is found that cathode erosion is localized in regions in axial alignment or registry with the axes of the magnetically-confined glow discharge columns. This increased localized erosion of the sputter cathode grid substantially shortens its operating life over the life of a flat cathode plate because of the reduction of the cathode density at the region of maximum erosion due to the removal of cathode material occasioned by the grid structure of the cathode. Therefore, sputter cathode grid structures that have thicknesses comparable to the thicknesses of flat cathode plates have substantially reduced operating lifetimes due to their lower density.

The present invention provides an improved sputter cathode grid wherein the portions of said sputter cathode grid structure, disposed in alignment or registry with the axes of the magnetically-confined glow discharge columns at the regions of maximum cathode erosion, are made of increased density as compared to less intensely bombarded portions of the sputter cathode grid thereby lengthening the cathode operating life. It has been found that these more dense regions of the sputter cathode grid, from which most of the sputtering occurs, do not deleteriously affect the pumping action of the sputter cathode grid structures. The features of the present invention are also applicable to triode getter ion vacuum pumps wherein an ion permeable sputter cathode grid is provided between the anode and the ion collecting electrode for enhancing sputtering of the cathode. In such triode configurations of the present invention, the ion permeable sputter cathode grid may be formed with regions of non-permeable solid construction disposed in substantial alignment with the axes of the glow discharge columns to prevent premature destruction of the sputter cathode grid in regions of more intense erosion. In an alternative triode configuration of the present invention, the sputter cathode grid portion of the cathode structure is provided with enlarged ion permeable apertures in alignment with the glow discharge columns and the apertures being backed up by more dense regions of the ion collecting electrode portion of the cathode structure.

The principal object of the present invention is to provide improved sputter cathode grid configurations for magnetically-confined glow discharge devices, which improved cathode configurations increase the operating life for such glow discharge devices.

One feature of the present invention is the provision of a cathode configuration for magnetically-confined glow discharge devices wherein the cathode structure includes a sputter grid portion and one or more regions of more dense cathode material, the region of more dense cathode material being disposed in substantial alignment or registry with the axes of the glow discharge columns for supplying additional cathode material in regions subject to increased erosion by ion bombardment thereby lengthening the cathode operating life.

Another feature of the present invention is the provision of a sputter cathode grid including a plurality of closely spaced slat portions outwardly extending from a cathode base member, said sputter cathode grid including one or more solid, unslatted, or built-up regions of increased density disposed in substantial alignment with the axes of the glow discharge columns whereby the operating life of the sputter cathode grid is enhanced.

Another feature of the present invention is the same as the first feature wherein the sputter cathode grid is also ion permeable.

Another feature of the present invention is the same as the preceding feature wherein the ion permeable sputter cathode grid portion includes non-ion permeable regions of increased density disposed in substantial alignment with the axes of the glow discharge columns.

Another feature of the present invention is the provision of a sputter cathode structure for magnetically-confined glow discharge devices wherein the cathode structure includes a sputter cathode grid portion and an ion collecting portion, the ion permeable sputter cathode grid portion including enlarged openings therein in substantial alignment with the axes of the glow discharge columns and the ion collecting portion of said cathode structure having regions of increased density disposed in substantial alignment with the axes of the glow discharge columns for receiving bombarding ions thereon.

Figure 2:
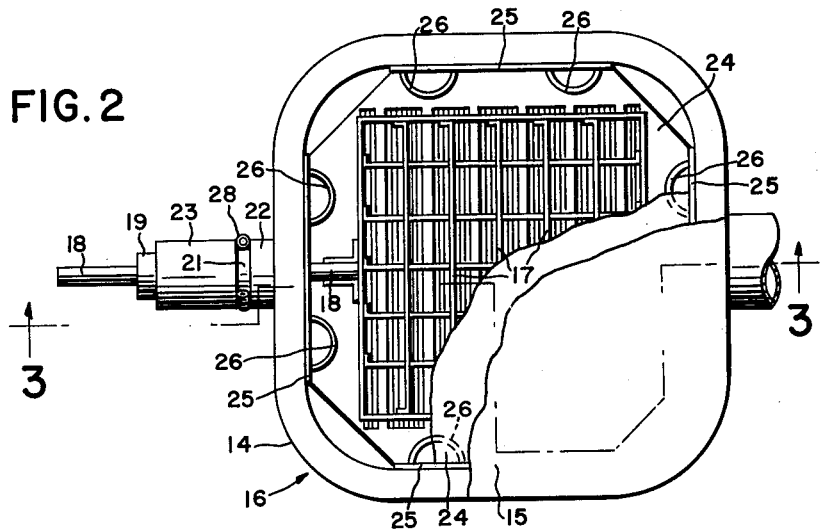
Figure 3:
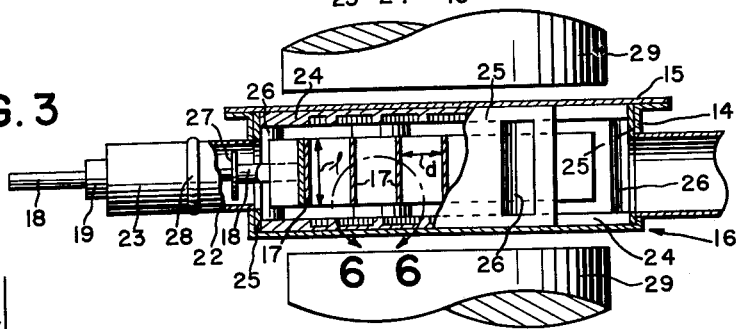
Figure 4:
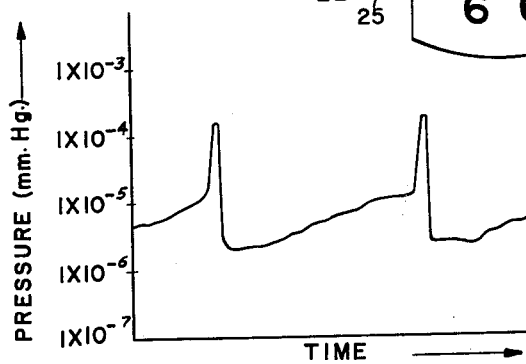
Figure 5:
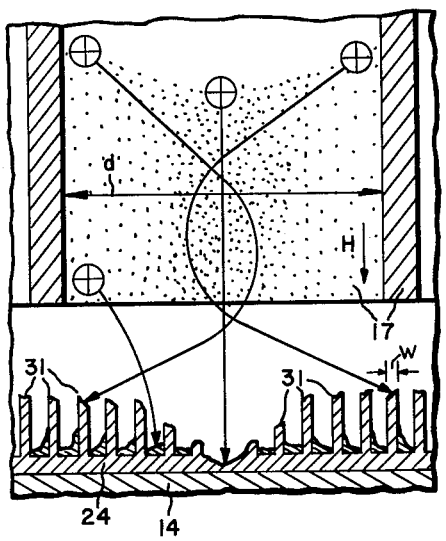
Figure 6:
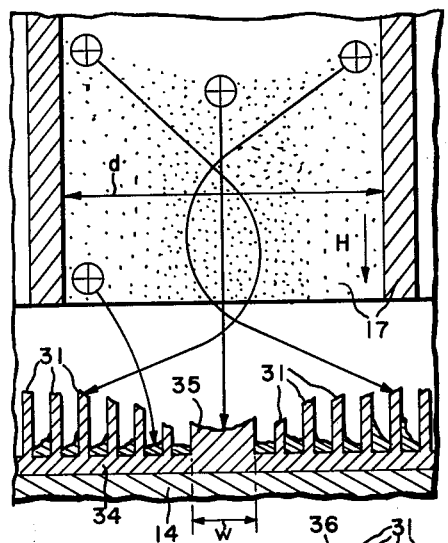
Figure 7:
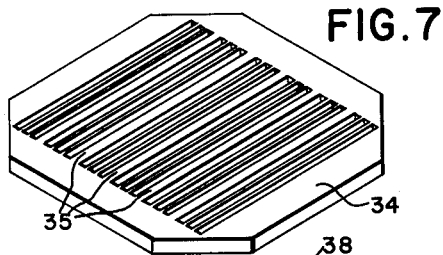
Figure 8:
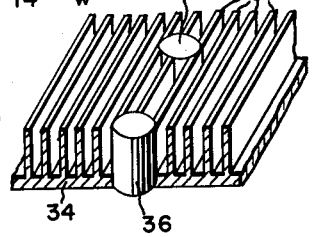
Figure 9:
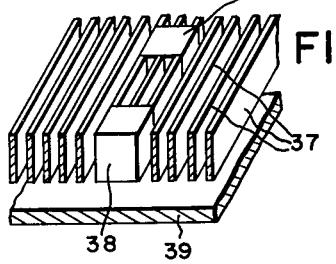
Figure 10:
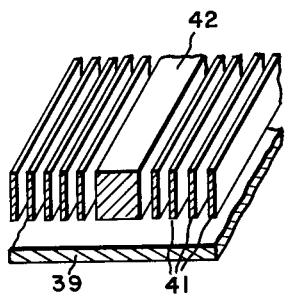
Figure 11:
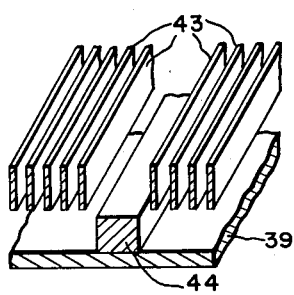
Figure 12:
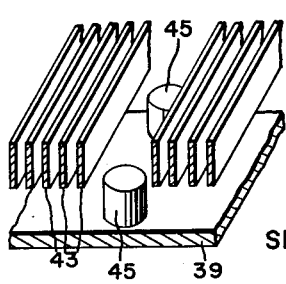
Figure 13:
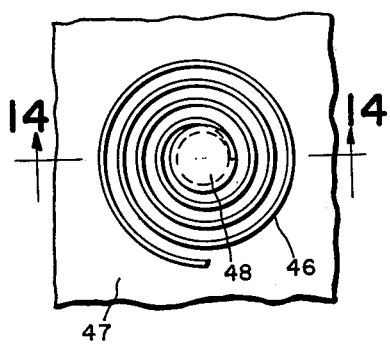
Figure 16:
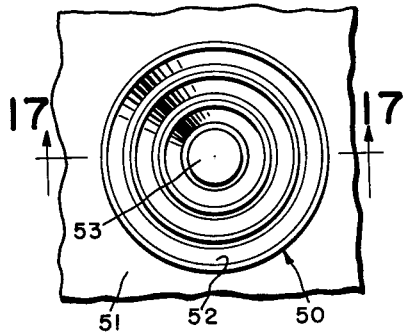
Figure 14:
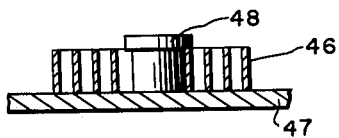
Figure 17:
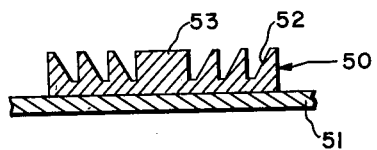
Figure 15:
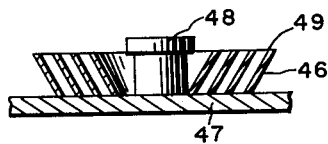

Other features and advantages of the present invention will become apparent upon a perusal of the specification taken in connection with the accompanying drawings wherein, FIG. 1 is a schematic circuit diagram depicting a typical evacuation system utilizing a vacuum pump employing the novel features of the present invention, FIG. 2 is a plan view, partly in cross section, of an electrical vacuum pump apparatus employing an improved slatted cathode of the present invention, FIG. 3 is a cross-sectional view of the structure of FIG. 2 taken along line 3—3 in the direction of the arrows, FIG. 4 is a graph of pressure versus time depicting argon instability encountered utilizing the prior art flat cathode plates, FIG. 5 is an enlarged detail view of a portion of a prior art structure similar to that portion of the structure of FIG. 3 delineated by line 6—6 and showing in schematic form the pumping mechanism and cathode erosion, FIG. 6 is an enlarged detail view of a portion of the structure of FIG. 3 delineated by line 6—6 and showing in schematic form the pumping mechanism and the cathode erosion in the present invention, FIG. 7 is an isometric view of a slatted cathode of the present invention formed by a plurality of closely spaced linear slots milled in the surface of the cathode plate and having unslated regions provided in alignment with the axes of the glow discharge columns, FIG. 8 is an isometric view of a slatted cathode embodiment of the present invention wherein the unslatted regions of the cathode are formed by inserts of solid cathode material, FIG. 9 is an isometric view of an ion permeable sputter cathode grid embodiment of the present invention wherein portions of the grid subject to intense ion bombardment are made of solid construction, FIG. 10 is an isometric view of an alternative embodiment of the structure of FIG. 9, FIG. 11 is an enlarged isometric fragmentary view of a cathode structure for a triode pump configuration wherein the ion permeable sputter cathode grid is provided with enlarged openings in regions subject to intense ion bombardment and the collecting portion of the cathode structure which is subject to intense ion bombardment is provided with portions of increased thickness, FIG. 12 is an enlarged isometric view of an alternative embodiment of the structure of FIG. 11, FIG. 13 is a plan view of a slatted sputter cathode grid of the present invention, FIG. 14 is a cross-sectional view of the structure of FIG. 13 taken along line 14—14 in the direction of the arrows, FIG. 15 is an alternative embodiment of the structure of FIG. 14, FIG. 16 is a plan view of a slatted sputter cathode grid of the present invention, and FIG. 17 is a cross-sectional view of the structure of FIG. 16 taken along line 17—17 in the direction of the arrows.

Referring now to FIG. 1, there is shown in schematic circuit diagram form an electrical vacuum pump embodiment of the present invention as utilized for evacuating a given structure. More specifically, an electrical vacuum pump 1 is connected via a hollow conduit 2 to a compression port 3 and thence via a hollow conduit 4 to the structure 5, which it is desired to evacuate. The compression port 3 serves to provide a connecting mechanism whereby the structure 5 and associated conduit 4 may be removed and replaced by another structure and conduit for successive evacuation of a plurality of structures 5. A mechanical vane vacuum pump 6 is also connected to compression port 3 via conduit 7 and pinch-off valve 8.

To evacuate the structure 5, the mechanical vane pump 6 is put into operation serving to reduce the pressure within the structure 5 to between 5 and 20 microns, at which point, valve 8 is closed and the electrical vacuum pump 1 started.

Pump 1 is supplied with operating potentials from a source 9 as, for example, a 60 cycle power line via transformer 11. The secondary of transformer 11 is provided with a rectifier 12 and shunting smoothing capacitor 13 whereby a D.C. potential may be applied between anode and cathode members of the electrical vacuum pump 1, which will be more fully described below. Although a preferred pump embodiment utilizes a D.C. potential, A.C. potentials are also operable.

Referring now to FIGS. 2 and 3, a shallow rectangular cup-shaped member 14 as of, for example, stainless steel is closed off at its flanged open end by a rectangular closure plate 15 welded about its periphery to the flanged portion of cup member 14 thereby forming a substantially rectangular vacuum tight envelope 16.

A rectangular cellular anode 17 as of, for example, titanium is carried upon the end of a conductive rod 18 as of, for example, stainless steel which extends outwardly of the rectangular vacuum envelope 16 through an aperture in a short side wall thereof. The conductive rod 18 is insulated from and carried by the vacuum envelope 16 through the intermediaries of annular insulator frames 19, 21 and 22 as of, for example, Kovar and cylindrical insulator 23 as of, for example, alumina ceramic. The free end of the rod 18 serves to provide a terminal for applying a positive anode voltage with respect to two substantially rectangular slatted cathode plates 24, more fully described below.

The slatted cathode plates 24 are mechanically locked in position against the large flat side walls of the vacuum envelope 16 via the intermediary of four cathode spacer plates 25. The cathode spacer plates 25, as of stainless steel, are provided with semi-cylindrical ears 26 struck therefrom for assuring proper spacing between the cathode plates 24. In a preferred embodiment, the anode to cathode spacings lie within the range of between 0.1" and 0.5". The cathode plates 24 may be made of any one of a number of reactive cathode metals such as, for example, titanium, chromium, zirconium, gadolinium, and iron. However, it is desirable, in order to prevent flaking of the condensed sputtered layer of cathode material, to make the anode 17 and cathodes 24 of the same material. The improved slatted cathode plates 24 are more described below.

Another side wall of the vacuum envelope 16 is apertured to receive the hollow conduit 2, which may be of any convenient inside diameter commensurate with the desired pumping speed. The hollow conduit 2 communicates with the structure 5 which it is desired to evacuate and is provided with a suitable mounting flange, not shown.

A circular radial shield 27 as of, for example, molybdenum is carried transversely of conductive rod 18 and is disposed inside insulator frame member 22 for shielding the insulator 23 from sputtered cathode material which might otherwise coat the insulator 23 and produce unwanted voltage breakdown or current leakage thereacross. An annular spring 28 is positioned circumscribing the frame member 21 to provide a quick disconnect connection between the power connector ground, not shown, and the pump 1.

A horseshoe-shaped permanent magnet 29 is positioned with respect to the shallow rectangular vacuum envelope 16 such that a magnetic field H as of, for example, 1200 gauss threads through the individual cellular elements of the anode 17 in substantial parallelism to the longitudinal axis thereof. Although a D.C. magnetic field is utilized, in a preferred embodiment of the present invention, A.C. magnetic or time varying D.C. magnetic fields may be utilized. For example, the fringing time varying magnetic field of a circular particle accelerating machine, such as the Bevatron, may be used.

In operation, a positive potential of 0.5 kv. or more such as, for example, 6 kv. is applied to the anode 17 via conductive rod 18. The vacuum envelope 16 and therefore the cathode plates 24 are preferably operated at ground potential to reduce hazard to operating personnel. With these potentials applied, a region of intense electric field is produced between the cellular anode 17 and the cathode plates 24. This electric field produces an electrical breakdown of the gas within the pump thereby forming a plurality of closely spaced glow discharge columns extending in the direction of the magnetic field and closely grouped transversely of the magnetic field. The glow discharge columns are disposed within separated glow discharge passageways defined by the margins of the anode openings or walls of the cellular compartments in the anode 17. In a preferred embodiment, the anode cells have a length, $l$, greater than their diameter, $d$.

Positive ions produced in the glow discharge strike the cathodes, which, in a preferred embodiment, are made of titanium. When pumping air, ionized molecules of $N_2$ and $O_2$ and Ar produce, upon striking the cathode 24, appreciable sputtering of titanium or titanium compounds from the cathode 24 onto the anode 17. Most of the pumped $N_2$ and $O_2$ thus ends up in chemical combination with titanium at the anode 17 of the pump.

Noble gases, such as argon and helium, because of their lack of chemical activity, are pumped primarily by ion burial in the cathode plates 24. In the absence of subsequent diffusion in the cathode interior, pumping by this mechanism should cease when the rate of sputtering out of previously buried gas atoms becomes equal to the rate of which ions are being buried. Thus, after many hours of operation, a pumping speed saturation effect occurs for argon. Since argon amounts to approximately 1% of air, it can give rise to argon instability, when using flat cathode plates. Argon instability phenomenon, as sometimes encountered with the prior art magnetically-confined cold cathode glow discharge getter ion pumps utilizing flat cathode plates, is depicted in FIG. 4.

However, continued pumping of the noble gases does occur in regions of certain cathode configurations where there is ion burial in regions of net build up of sputtered cathode material. Therefore, it has been found that the prior art sputter cathode grid, FIG. 5, which is characterized by increased sputtering and regions where there is both a net build up of sputtered cathode material and ion burial, provides the needed increased pumping speed for noble gases, over that obtained by a flat cathode, and thereby eliminates, when pumping air, any tendency for argon instability to occur.

Referring now to FIG. 5, there is shown a sputter cathode grid design of the prior art. More specifically, the face of the cathode plate 24, which is disposed adjacent the open ends of the anode cells, is provided with a plurality of closely spaced parallel-directed linear slots thereby forming a plurality of closely spaced cathode slats 31 out of the land region between adjacent slots. The cathode slats 31 may be readily formed by cutting slots in the cathode plate with a ganged slotting saw employed on a milling machine.

The distance between adjacent slats 31 should be small in comparison with the diameter $d$ of an anode cell and the width, $w$, of the slat 31 should be smaller than the distance between slats. The depth of the slot should be larger than its width. In a preferred embodiment, the slat width is approximately 0.012"; the slot width is approximately 0.028"; the slot depth is approximately 0.090"; the cathode plate thickness, including the height of the slats 31, is approximately 0.125"; and the anode cell diameter $d$ is approximately 0.5".

The pumping mechanism for the improved slatted cathode grid is shown in FIG. 5. More specifically, some high energy positive ions, which are generated near the inner side walls of and well within the individual cellular anode compartments 17, are attracted toward the negative space charge core of the glow discharge column. The positive ions are acted upon by both an axial and a radial electric field to produce a radial oscillation superimposed on the axial component of the trajectory directed toward the cathode thereby causing these high energy positive ions to intercept the slatted cathode plate 24 on the free ends of the cathode slats 31 and at a substantial angle to a perpendicular extending outwardly from the cathode plate. Some of these ions will collide with the cathode plate 24 at a substantial radial distance from the point where the axial center line of the anode cell intercepts the cathode plate 24. Some of the cathode material sputtered from the free ends of the cathode slats 31 will be deposited farther down in the cathode slots resulting in a net build up of sputtered material within the bottom of the slots.

Other ions will be created essentially within the core of the glow discharge columns and therefore will have very little radial component to their trajectories. These ions are focused by the anode to bombard the cathode plate 24 in substantial alignment with the axes of the individual cellular compartments of the anode 17 and consequently produce a substantial amount of erosion of the cathode in these localized regions. This cathode erosion will shorten the operating lifetime of the sputter cathode grid as opposed to the life of a flat cathode plate.

Still other ions will be produced in places where they will have trajectories to intercept the cathode plate 24 in regions thereof where there is a net build up of sputtered cathode material as found in the bottoms of the cathode slots. These ions will be buried in the built-up material and will be subsequently covered over with additional sputtered cathode material. This burying and covering over mechanism accounts for the increased pumping action for noble gases and permits elimination of argon instability encountered with the prior art flat cathode plates.

By placing the cathode slats 31 in good thermal contact with the cathode base plate 24, increased thermal conductivity is obtained over cathode geometries wherein the slats 31 were held in a frame member substantially only at the ends of the slats. Increased thermal conductivity of the cathode slats 31 permits heat, generated by ion bombardment of the slats 31, to be readily conducted to the base plate 24 and thence to the pump envelope 16 where it may be readily dissipated. If the temperature of the cathode slats 31 becomes too great, gases which have been buried in the cathode material will be driven out, deleteriously affecting the pumping performance of the pump. In addition, excessive heating of the cathode slats 31 will cause warping thereof thereby destroying the aforementioned preferred cathode geometry and consequently deleteriously affecting the pumping action of the slatted cathode. Therefore, by rigidly connecting the cathode slats 31 to the cathode base member 24, along their abutting edge portions, both the mechanical rigidity and thermal conductivity of the cathode slats is increased over the prior art framed cathode slats. In addition, when the cathode slats are formed by milling, as in the preferred embodiment of the present invention, the cathode plates are more easily fabricated than when individual cathode slats are inserted, at their ends, in a frame member.

In FIGS. 6 and 7 there is shown a preferred embodiment of the present invention wherein the sputter cathode grid is formed by a slatted cathode plate 34. The density of the slatted cathode plate is increased in certain regions by leaving ridges 35 of unslotted cathode surface. The ridges 35 of unslotted cathode are disposed in substantial alignment or registry with the axes of the magnetically confined glow discharge columns, not shown in FIG. 7, thereby providing more dense regions of cathode plate for receiving the intense ion bambardment thereon thereby lengthening the cathode life over a cathode wherein the slatted portions of the cathode are subjected to the more intense regions of ion bombardment. In a typical example, the ridges 35 or regions of more dense cathode structure are approximately ⅛" wide when utilized with anode cells having individual cell diameters $d$ of approximately ½". Therefore, the width $w$ of the unslatted cathode ridge 35 is approximately 25% of the typical anode cell diameter $d$. The more dense cathode ridges 35 extend transversely of the slatted cathode member 34 thereby lending greater mechanical rigidity and increased thermal conductivity to said slatted cathode geometries as compared to slatted cathodes wherein slats 31 are distributed uniformly across the surface of the cathode plate 34.

In FIG. 8 there is shown an alternative embodiment of the present invention wherein the slatted cathode plate version of the sputter cathode grid is provided with solid insert plugs 36 forming the regions of increased cathode density. The cathode insert plugs 36 are disposed in substantial alignment or registry with the axes of the glow discharge columns produced by the cellular anode 17, not shown. In a preferred embodiment, the insert plugs 36 are pressed into the slatted cathode plate 34 through suitable openings provided therein, as by boring. The insert plugs 36 are preferably made of the same material as the cathode base member 34. The insert plugs 36 serve substantially the same function as the previously described cathode ridges 35 of FIGS. 6 and 7, namely, to increase the cathode life by providing additional cathode material at the points of maximum ion bombardment. The cathode insert plugs 36 also serve to increase thermal conductivity from the intensely bombarded regions of the cathode to the base plate member 34 and lend increased mechanical rigidity to the slatted cathode base member 34.

In FIG. 9 there is shown another embodiment of the present invention wherein an ion permeable sputter cathode grid 37 is provided with regions of more dense cathode material formed by non-ion permeable solid insert members 38. The insert member portions of the ion permeable sputter cathode grid are disposed in substantial alignment with the axes of the glow discharge columns produced by the openings in the cellular anode 17, not shown. The ion permeable sputter cathode grid 37 operates at a potential more negative than the aforementioned anode 17 and is subjected to ion bombardment by ions produced by the magnetically-confined glow discharge. Cathode material sputtered from the ion permeable sputter cathode grid 37 is collected on certain interior portions of the grid 37 and also on the cathode plate 39 which is disposed on the opposite side of the grid 37 from the anode 17 and spaced apart therefrom. The cathode plate 39 is operated at a potential negative with respect to the anode 17 but may be operated either positive, negative, or at the same potential with respect to grid 37. As in the slatted cathode embodiments previously described, the ion permeable sputter cathode grid 37 is subjected to intense ion bombardment at the regions thereof in alignment with the centers of the separated glow discharge columns. The solid insert portions 38, which may be made of the same material as the sputter cathode grid 37 as of titanium, zirconium, chromium, or gadolinium, serve to lengthen the operating life of the sputter cathode grid 37 by providing additional cathode material at points of maximum ion bombardment and thus maximum cathode erosion.

The insert members 38 also serve to increase thermal conductivity from said regions of intense ion bombardment to other portions of the grid 37 and frame members, not shown, for holding said sputter cathode grid 37. Insert members 38 also provide additional mechanical rigidity to said sputter cathode grid 37. As in the previous embodiments, an exemplary transverse dimension of the insert member 38 is approximately 25% of the transverse dimension or diameter $d$ of a cellular compartment of anode 17, not shown.

In FIG. 10 there is shown an alternative embodiment of the ion permeable sputter cathode grid, previously described in FIG. 9. In the embodiment of FIG. 10 the ion permeable sputter cathode grid 41 is provided with a region of increased density formed by an unslatted or solid rib 42 of the ion permeable sputter cathode grid 41. The width of the rib 42, providing a region of increased density, is preferably in the order of 25% of the diameter of the individual cellular anode compartments, not shown. The solid rib 42 of the grid 41, as in the previous embodiments, is disposed in substantial alignment or registry with the axes of the cellular anode compartments to receive the intense ion bombardment thereon. The rib 42 thereby provides additional cathode material for sputtering in the regions of intense ion bombardment and thereby increases the operating life of the sputter cathode grid 41. In addition, the rib 42 provides additional thermal conductivity and mechanical rigidity to the sputter cathode grid 41 whereby the operating performance of said ribbed sputter cathode grid 41 is improved over a uniformly slatted grid.

In FIG. 11 there is shown an alternative embodiment of the present invention. In particular, an ion permeable slatted sputter cathode grid 43 is provided with enlarged openings as by removal of certain of the adjacent cathode slats. The removed slats are disposed in substantial alignment with the axes of the glow discharge columns produced by the spaced openings in the cellular anode 17, not shown. A ridge member 44 is carried from the cathode plate 39 in abutting contiguous relationship and is disposed in substantial registry with the opening in said grid 43. The ridge member 44 and cathode plate 39 are disposed in spaced apart relationship from the cathode sputter grid 43 and on the side of the grid remote from the anode 17 for receiving the intense ion bombardment thereon. The cathode ridge 44 is preferably placed in good thermal contact with the cathode plate 39 as being milled therefrom or brazed thereto. As in the previous example, the width of the ridge 44 is substantially equal to the width of the enlarged opening in the sputter cathode grid 43 which in turn is approximately 25% of the transverse dimensions of the cellular openings in the anode 17, not shown.

The operating life of the ion permeable sputter cathode grid 43 is substantially enhanced over a uniformly slatted ion permeable sputter cathode grid since the intense ion bombardment is not received on the relatively thin fragile sputter cathode grid slats 43 but instead is received on the more dense portion of the cathode structure formed by the ridge member 44. Ridge member 44 provides greater conductivity for the thermal energy released by the intense ion bombardment thereon and assists in readily conducting this thermal energy to the pump envelop 16 where it may be readily dissipated. In addition, the ridge 44 lends additional mechanical rigidity to the cathode plate 39 and enhances sputtering of cathode material onto the sputter cathode grid 43 where the sputtered material may serve to entrap gas molecules coming in contact therewith. The cathode grid 43 and ridge 44 may be made of any suitable cathode material such as those cathode materials mentioned above and is preferably made of the same material as the cathode plate 39.

In FIG. 12 there is shown an alternative embodiment of the present invention. This embodiment is similar to the embodiment shown in FIG. 11 with the exception that the cathode ridge 44 of FIG. 11 is replaced by spaced plugs 45. The plugs 45 are made of the same material as the previously described ridge or land 44 and are preferably placed in good thermal contact with the cathode plate 39. The cathode plugs 45 are disposed at substantial alignment or registry with the axes of the separated glow discharge columns produced by the closely grouped openings in the cellular anode 17, not shown. The plugs 45, as in the embodiment of FIG. 11, receive the intense ion bombardment thereon thereby increasing the operating life of the cathode, enhancing thermal conductivity from the regions of intense bombardment to the cathode plate 39 and enhancing sputtering of the cathode material from the plugs onto the cathode grid 43.

In FIGS. 13 through 15 there is shown another embodiment of the present invention. A sputter cathode grid is formed by affixing one or more spiral tapes 46 onto the cathode plate 47 as by, for example, spot welding or vacuum brazing. A plug 48 is provided essentially at the center of each of the spiral tapes 46. The plug 48 and tape 46 are made of a suitable cathode material, such as any of those materials mentioned above. The tape 46 and plug 48 are placed in good thermal contact with the cathode plate 47. The plug 48 may be press-fitted into an opening provided in the cathode plate 47.

The plugs 48 are placed in substantial registry with the axes of the glow discharge columns produced by the openings in the cellular anode 17 and receive the intense ion bombardment thereon to increase the operating life of the slatted cathode grid by increasing the density of the cathode material in regions of intense ion bombardment. In this embodiment, the spiral tape 46 is preferably formed out of a spring-like material and the inner end of the spiral is physically secured to the central post or plug 48 as by riveting, spot welding, or brazing.

In a preferred embodiment of the structure of FIGS. 13 and 14, the upper free edge portions 49 of the spiral land, formed by the tape 46, are radially outwardly deformed by a suitable angle as of between 5 and 25 degrees out of the normal from the plate 47, as shown in FIG. 15, thereby enhancing the pumping action of the slatted cathode. Such deformation of the spiral slat 46 provides a more nearly optimum configuration for enhanced sputtering and burial of ions in regions of net build up of sputtered material within the cathode structure to optimize the pumping speed of the cathode grid structure for noble gases.

In FIGS. 16 and 17 there is shown another embodiment of the present invention. In this embodiment the sputter cathode grid structure is formed by vacuum brazing one or more pressed powdered metal members 50, as of titanium, onto a cathode base plate 51 as of, for example, titanium. The pressed metal member 50 may be formed of pure powdered titanium formed under pressure into a suitable shape such as a plurality of concentrically disposed lands 52 having a centrally disposed post 53 formed therein. Powdered metal cathodes form the subject matter of and are claimed in a co-pending application of R. L. Jepsen, U.S. Serial No. 135,010 filed August 30, 1961 and assigned to the same assignee as the present invention. The post 53 is disposed in substantial registry with the axes of the glow discharge columns produced by the openings in the cellular anode 17, not shown. The post 53 receives the intense ion bombardment, and as in the previous embodiment, due to its solid construction provides additional material in the regions of maximum ion bombardment to enhance operating life of the slatted sputter cathode grid.

Since many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A sputter cathode structure for glow discharge apparatus including, means forming a cathode structure subject in use to erosion by ion bombardment for sputtering of cathode material, said cathode structure having a grid portion with surface regions thereof disposed at glancing angles of incidence to the bombarding ion trajectories for enhancing erosion of said grid portion by increasing cathode sputtering therefrom, said cathode structure being subjected in use to uneven erosion and sputtering by ion bombardment such that a certain region is subjected to more intense erosion than another region of said cathode structure, and means providing increased density of said cathode structure in the region of more intense erosion than in the region of less intense erosion thereby increasing the operating lifetime of said cathode structure while conserving cathode material.

2. The apparatus according to claim 1 wherein said grid portion of said sputtering cathode structure includes a plurality of spaced apart relatively thin slat portions disposed straddling and alternately spaced with a plurality of relatively wide regions occupied by said means for increasing said sputter cathode structure density.

3. The apparatus according to claim 2 wherein the width of said relatively wide region occupied by said means for increasing cathode structure density is within the range of 20%–50% of the spacing between said spaced apart relatively wide regions of increased cathode structure density.

4. The apparatus according to claim 2 wherein said means for increasing the density of said cathode structure in the region of more intense ion erosion includes a substantially solid member straddled by said spaced apart substantially thinner slat portions.

5. The apparatus according to claim 4 wherein said solid member comprises a plug.

6. The apparatus according to claim 4 wherein said solid member comprises a rib.

7. The apparatus according to claim 4 wherein said grid portion of said cathode structure has an enlarged opening therein substantially in registry with the region of more intense ion bombardment of said cathode structure for passage of said bombarding ions therethrough, and said solid member portion of said cathode structure for increasing said cathode structure density disposed in substantial registry with the region of more intense ion bombardment for receiving the more intense ion bombardment thereon after passage of said bombarding ions through said enlarged opening in said cathode grid portion of said cathode structure.

8. The apparatus according to claim 5 including means forming a cathode base plate, and said slat portions and said plug being supported in abutting relationship from a face of said cathode base plate, whereby mechanical rigidity and thermal conductivity of said cathode grid portion is enhanced.

9. The apparatus according to claim 5 wherein said cathode grid portion is ion-permeable and has an enlarged opening therein substantially in registry with the region of more intense ion bombardment of said cathode structure for passage of said bombarding ions therethrough, and said plug being disposed on the side of said grid portion remote from a source of the bombarding ions and in substantial registry with the region of more intense ion bombardment to receive the more intense ion bombardment thereon after the bombarding ions have passed through said enlarged opening in said cathode grid portion of said cathode structure.

10. The apparatus according to claim 6, including means forming a cathode base plate, and said cathode slat portions and said cathode rib supported in abutting relationship from a face of said cathode base plate whereby mechanical rigidity and thermal conductivity of said cathode grid portion are enhanced.

11. The apparatus according to claim 6 wherein said slatted grid portion of said cathode structure is ion-permeable and provided with an enlarged opening therein substantially in registry with the region of more intense ion bombardment of said cathode structure for passage of said bombarding ions therethrough, and said cathode structure having said rib member disposed on the side of said ion-permeable grid portion remote from a source of bombarding ions to receive the intense ion bombardment thereon after the ions have passed through said enlarged opening in said ion-permeable cathode grid portion.

12. Apparatus according to claim 8 wherein a plurality of plugs are provided on said base plate and the characteristic transverse dimension of one of said plug members is between 20%–50% of the spacing between adjacent similar plug members.

13. The apparatus according to claim 8 wherein said plug member is centrally disposed of a plurality of radially outwardly spaced-apart substantially curvilinear slat portions.

14. The apparatus according to claim 8 wherein said plug member is straddled by a plurality of substantially rectilinear parallel directed slat portions.

15. The apparatus according to claim 9 wherein there are provided a plurality of said plug members, the characteristic transverse dimension of individual of said plug members lying within the range of 20%–50% of the spacing between similar adjacent plug members.

16. The apparatus according to claim 10 wherein said cathode structure includes a plurality of similar rib portions, said similar rib portions being spaced apart and the width of said rib portions being within the range of 20%–50% of the spacing between similar adjacent rib portions.

17. The apparatus according to claim 13 wherein said radially outwardly spaced apart curvilinear slat portions are formed by an outwardly tensioned spiral wound spring tape fixed at its innermost end to said centrally disposed plug member.

18. The method for making a sputter cathode grid structure subject in use to uneven erosion by ion bombardment including the steps of, molding powdered metal under pressure into a member having spaced apart relatively thin slat portions disposed straddling a region occupied by a build-up of the powdered material forming a more dense region of said pressed powdered metal member with a width greater than the width of individual of the slat portions, and affixing said powdered metal member onto a base plate to form a sputter cathode grid.

19. A getter-ion vacuum pump apparatus including, a hollow evacuable envelope for containing therewithin the elements of the pump apparatus and adapted for connection to a structure it is desired to evacuate, means forming an anode structure disposed within said envelope and having a plurality of closely spaced openings therein for defining a plurality of closely spaced paths for glow discharge within the openings in said anode structure, a cathode structure disposed opposite the openings in said anode structure for ion bombardment by ions produced by the glow discharge in use to produce both sputtering of portions of said cathode structure for gettering gas molecules within said envelope and to produce burial of gas ions in said cathode structure, said cathode structure having a grid portion with surface regions thereof disposed at glancing angles of incidence to the bombarding ion trajectories for enhancing erosion of said grid portion by increasing sputtering therefrom, said cathode structure being subjected in use to uneven erosion by ion bombardment such that certain relatively localized regions are subjected to more intense erosion than other regions of said cathode structure, and means providing increased density of said cathode structure in the localized regions of more intense erosion than in the regions of less intense erosion thereby increasing the operating lifetime of said cathode structure while conserving cathode material.

References Cited in the file of this patent
UNITED STATES PATENTS
2,937,301   Germeshausen et al. _____ May 17, 1960